Oct. 2, 1962 J. E. CAMPBELL 3,056,491

FLUID CONTAINERS

Filed Aug. 29, 1958

INVENTOR.
John E. Campbell
BY Brown and Mikulka
and
Stanley H. Mervis
Attorneys

United States Patent Office 3,056,491
Patented Oct. 2, 1962

3,056,491
FLUID CONTAINERS
John E. Campbell, Needham, Mass., assignor to Polaroid Corporation, Cambridge, Mass., a corporation of Delaware
Filed Aug. 29, 1958, Ser. No. 758,056
12 Claims. (Cl. 206—56)

This invention relates to fluid containers and more particularly to fluid containers adapted to retain photographic processing compositions.

United States Patents Nos. 2,543,181; 2,634,886; 2,653,- 732; 2,674,532; 2,702,146; 2,723,051; and 2,750,075 disclose fluid containers adapted to retain photographic processing compositions and which are formed of a plurality of layers comprising, respectively, an outer layer of kraft paper, a layer of metal foil, and an inner liner or layer of a thermoplastic resin, preferably a polyvinyl acetal, especially polyvinyl butyral. In addition, it is disclosed that the aforesaid thermoplastic resins may be modified, as for example by the addition of appropriate plasticizers. A preferred polyvinyl butyral liner is disclosed as having admixed therewith dibutyl sebacate and nitrocellulose.

The containers of the prior art are subject to deterioration thereof effected by prolonged contact with caustic alkali and/or organic nitrogen-containing compounds, as for example, the cyclic imide and nitrogenous base silver halide complexing agents disclosed in the copending United States application of Land et al., Serial No. 378,684, filed September 4, 1953, now U.S. Patent No. 2,857,274.

Objects of the present invention are to provide improved fluid containers, that is, improved containers of the aforesaid construction wherein the polyvinyl acetal inner coat or layer is replaced by an inner coat, liner or layer of polyvinyl chloride; substantially impervious to vapor; substantially impervious to alkali, especially to highly caustic liquid solutions; substantially impervious to nitrogen-containing compounds of the last-mentioned type; having pliable walls whereby said container is readily deformable; and having a sealed passage adjacent to at least one edge thereof which may be substantially uniformly unsealed throughout a predetermined length of said sealed passage upon application of stress to said container.

Further objects of the present invention comprise providing a continuous material from which individual blanks, adapted to form the aforementioned fluid containers, may be manufactured.

Other objects of the present invention will in part be obvious and will in part appear hereinafter.

The invention accordingly comprises the products possessing the features, properties, and relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein like reference characters refer to like parts throughout the several views and wherein.

Frequently it is required that a small quantity of liquid material be applied in a relatively thin layer over a fairly large surface area. For example, a photosensitive film may be processed or a picture may be toned by applying on the surface thereof, a layer of liquid containing the processing reagents, for example, a silver halide developing composition of the type disclosed in United States Patent No. 2,543,181, issued February 27, 1951 to Edwin H. Land, or toning agents in solution. Another example of the need for applying a thin liquid layer over a large surface area resides in the application of a dye or ink to a hand press or printing block for producing prints or impressions. Adhesion of two elements also often necessitates a continuous layer of an adhesive between surfaces of said elements. The present invention comprehends an inexpensive, preferably disposable, container adapted to provide for such uses a liquid which is in a quantity sufficient to carry out a single application to the respective surfaces of a sheet to be treated and which is in condition for direct application to said surfaces whereby to afford greater efficiency and economy of operation. Where desired, the aforementioned container may be directly affixed to or in apposition to a surface to be treated.

In one embodiment, the container is an elongated structure, having a length of at least twice its width, and is relatively flat, having a depth which is only a fraction of its width. The container is deformable in its filled and sealed condition so that it can be curved in the direction of its width, for example, about a radius equal to its width, without danger of rupturing its seal. A sealed passage extends the length of the container along one edge thereof and is the weakest of the edge seals which define the liquid-containing cavity and which confine the contents of said cavity.

The container should be fluid-tight, vapor-impervious and inert to its retained contents whereby the contents may be kept substantially unaffected by external agents, including the container itself, for an extended time interval.

The present invention is concerned with improved fluid containers of the aforementioned type which substantially avoid container degradation and fluid contamination resultant from the utilization of said containers to retain organic nitrogen-containing compounds and/or caustic alkali liquids such as highly caustic and/or organic nitrogen compounds containing photographic processing compositions.

In addition, the present invention is concerned with providing frangible containers of the aforementioned type which exhibit increased differential strength of the respective edge seals, thus facilitating substantially uniform rupture and distribution of the container's fluid contents by means of a predetermined passage orifice upon application of stress to said container's deformable surfaces.

Figure 1:
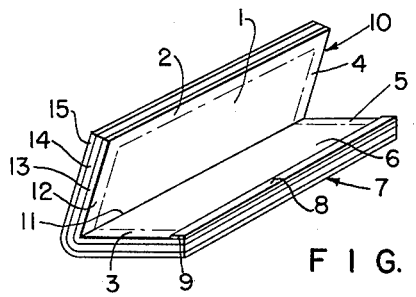
FIGURE 1 is a perspective view of one form of fluid container prior to introduction of a liquid thereinto and subsequent closure of the container walls.

The container is preferably formed from a single, essentially rectangular blank folded medially, as illustrated in FIG. 1. The container is constructed of a multilayer, preferably medially folded, material comprising walls 7 and 10, said individual walls being formed by medial fold 11. A surface portion of one of said walls as, for example, portion 6 of wall 7, is suitable for receiving and in part confining said liquid, and a substantially equal surface portion of the other of said walls as, for example, surface portion 1 of wall 10 is suitable for further confining said fluid upon closure of said walls. The container may also be formed from two essentially rectangular blanks secured together at the marginal edges. It is so simply constructed that the container blank of FIG. 3, from which the container is formed, may be cut without waste from a continuous strip of sheet material, permitting the material of the container walls to be processed and the container to be filled, sealed and severed as part of one continuous operation.

Figure 2:
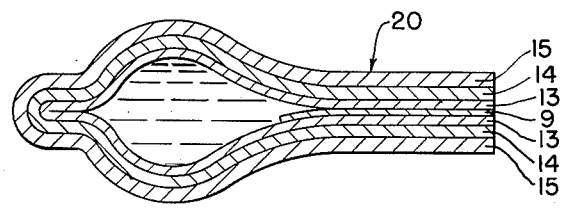
FIG. 2 is a cross-sectional view comprising the fluid container of FIG. 1 after introduction of a liquid and closure of said container's walls.

The aforesaid fluid container is preferably constructed, as illustrated in FIG. 2, of an outer layer 15 as a backing or support layer, said outer layer 15 being preferably preformed of a thin, deformable, relatively inexpensive, tough material which may be a plastic but which is preferably a paper, such as a kraft paper. A thin film or sheet 14 of a relatively thin, impervious sheet material, such as a metal foil, for example, a sheet of lead, aluminum, etc., foil, approximating 0.001 inch in thickness and having dimensions predetermined according to the intended use is suitably adhered to a surface of a layer 15. A layer 13 comprising polyvinyl chloride is suitably adhered to the exposed surface of layer 14.

The polyvinyl chloride liner may be adhered to the metal foil layer by coating and/or laminating procedures well known to the art. Where a precast polyvinyl chloride liner is laminated to the metal foil, it is generally preferred to utilize an adhesive coating or layer interposed between the polyvinyl chloride and the metal foil layer, which adhesive layer is itself stable or stabilized against interaction with the container's fluid contents. There is, according to this method of lamination, thus afforded an additional layer enhancing the stability of the container and its retained liquids. Maximum-thickness laminating adhesive coats serve as an added barrier coating for retaining the container's liquid contents. It is also contemplated, within the scope of the present invention, to employ as the polyvinyl chloride liner a coated layer of polyvinyl chloride, as for example, a polyvinylidene chloride coated layer of polyvinyl chloride.

The term "polyvinyl chloride" as used herein, is intended to signify, in addition to polyvinyl chloride, a copolymeric derivative thereof, as for example, vinyl chloride-vinyl acetate copolymers, preferably comprising approximately 90% vinyl chloride and approximately 10% vinyl acetate, by weight. It will be recognized that the respective aforementioned concentrations of the copolymeric components may be modified to suit the requirements of the operator provided that the predominant or major portion of the respective copolymer comprises vinyl chloride. A second illustrative copolymeric derivative comprises vinyl chloride-vinylidene chloride copolymers, the concentrations of which components may be varied over a wide range.

In the completed, closed, liquid-carrying container, the aforementioned polyvinyl chloride coating 13 serves both to substantially prevent direct contact of the carried fluid with the vapor-impervious layer 14 and as a means of of bonding together the facing marginal portions of said polyvinyl chloride layer bordering the enclosed liquid when, for example, the marginal portions are subjected to an application of heat and/or pressure, said portions thus bonded providing means for sealing the liquid within the container. A second coating 9 of an adhesive composition as, for example, one of the following illustrative compositions:

(1) 100 cc. of a composition comprising:
  5 grams of Bakelite NYGV (trade name of Bakelite Company, a division of Union Carbide & Carbon Corporation, New York, N. Y., for a polyacrylonitrile-polyvinyl chloride resin),
  5 grams of Bakelite NYGL (trade name of Bakelite Company, a division of Union Carbide & Carbon Corporation, New York, N. Y., for a polyacrylonitrile-polyvinyl chloride resin), and
  100 cc. of acetone,
  1 gram of Saran F-120 (trade name of Dow Chemical Company, Midland, Michigan, for a thermoplastic resin produced by the polymerization of vinylidene chloride ($CH_2=Cl_2$), and
  3 grams of Acryloid B-72 (solid) (trade name of Rohm & Haas Company, Philadelphia, Pennsylvania, for an acrylic ester resin);
(2) 80 cc. of a 10% solution of ethyl cellulose in methyl ethyl ketone, and
  20 cc. of a 10% solution of Acryloid B-72;
(3) 50 cc. of a 10% solution of Saran F-120 in methyl ethyl ketone, and
  10 cc. of a 10% solution of nitrocellulose in methyl ethyl ketone;

overlaid on a marginal portion 8 of polyvinyl chloride layer 13, when bonded to a facing marginal polyvinyl chloride portion 2, serves as a means for bonding said facing marginal portions differentially with respect to other facing marginal portions 4, 5, 3 and 12 comprising solely polyvinyl chloride.

Upon closure of walls 7 and 10, marginal surface portions 2, 4 and 12 come in contact with marginal surface portions 8, 5 and 3, respectively, and may be suitably bonded together and, when thus bonded, provide, in conjunction with fold 11, means for effecting a completely sealed enclosure or space.

In the aforementioned adhesive composition (1), the inherent adhesive capacity exhibited by thermoplastic Saran F-120 for binding polyvinyl chloride is suitably modified by the addition of a polyacrylonitrile-polyvinyl chloride resin affording the desired release properties and by the addition of an acrylic ester resin to effect the desired liquid impermeability and tightness of the adhesive strip layer. It must be noted that the aforementioned adhesive compositions are set forth for the purpose of illustration only and that the adhesive and/or other components of the adhesive compositions therein set forth may be suitably modified by the addition of, deletion of, and/or variance of one or more modifying components. In addition, substitution of one or more known adhesives with and/or without their respective modifying agents for the aforesaid Saran F-120 adhesive may be effected.

It will be apparent that alternative but functionally similar means will provide differential adhesion of marginal surface portions of a container or, for providing a portion thereof prone to fracture or separation, may be employed for obtaining directional release of a contained liquid. Such alternative means may comprise a greater width of marginal surface portions 4 to 5 and 12 to 3 than that of the marginal surface portions 2 to 8, said relative dimensions permitting the direct adhesion of the polyvinyl chloride portions. Further modifications comprise the application of differential heat and/or pressure activation to the respective marginal surface portions and/or the insertion of a strip of material, as for example, a strip of cellulose acetate, between marginal surface portions.

Figure 3:
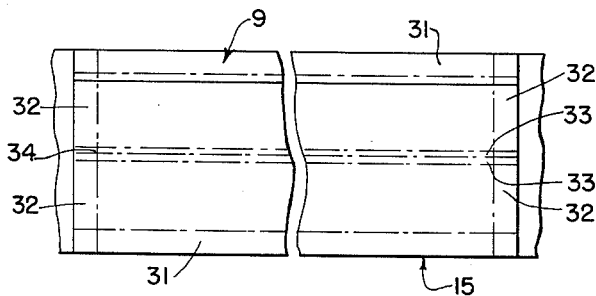
FIG. 3 is a fragmentary, plan view of the continuous material which is used in the formation of the container blanks of FIG. 1.
Figure 4:
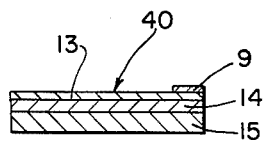
FIG. 4 is a cross-sectional view of the continuous material of FIG. 3.

Referring to FIG. 3, there is shown a blank 30 from which one embodiment of the novel container of the present invention may be formed, said blank 30, as shown, being substantially rectangular in shape and having a length equal to the container length, and a width approximately twice the width of the finished, filled container. As previously stated, the blank 30 is preferably formed of a composite, deformable sheet material comprising a plurality of strata, as illustrated in FIG. 4.

Outer layer 15 serves as the aforementioned backing or support layer which has applied thereto layer 14 which, as previously mentioned, is a thin film or sheet of a relatively vapor-impervious material, such as a metal foil. On the surface of said foil layer 14, a layer 13 of polyvinyl chloride comprising one or more strata is adhered to said foil layer 14 by the application of heat and/or pressure and/or an appropriate adhesive. Layers 13 and 14 are relatively thin, being only sufficiently thick to be continuous.

Along one edge of the blank 40, there is provided a strip 9 of a suitable thermoplastic composition previously set forth which exhibits, preferably, a lesser adhesive affinity for polyvinyl chloride layer 13 than the latter polyvinyl chloride layer has for itself upon sealing.

Container 20, illustrated in FIG. 2, is formed by folding blank 30 along a substantially medial line 34 extending the length of the container and then securing together the faces of the marginal portions 32 along the short edges of the container and the facing marginal surface portions 31 along the long edge of the container. As previously mentioned, the several marginal portions are secured together by the application of heat and/or pressure and, in addition, it is preferable to adhesively secure together a narrow strip 33 of the container walls adjacent to the fold line 34. This provides a thin leading edge for the container over which a suitable pressure-applying device, such as a pressure roll or a doctor blade, may be readily advanced to compress the container walls and effect the release of the container contents by differential hydraulic rupture of the sealed marginal surfaces, preferably along the long edge of the container. The seal along the long edge of the container is effected between the inner polyvinyl chloride layer 13 and the material strip 9 which, as hereinbefore indicated, is a material which has a different adhesive affinity, preferably a lesser adhesive affinity, for polyvinyl chloride layer 13 than polyvinyl chloride for itself. Since the short-edged portions 32 are secured together by a bond formed by direct contact between the inner polyvinyl chloride layers 13, the latter bond exhibits a differing adherence capacity, preferably an adhesive capacity substantially stronger, than the seal along the long edge.

This structure assures a unidirectional release of the contents of the container upon application of the compressive squeezing force to the walls thereof. In the preferred embodiment, to make certain a uniform peeling or separation of the marginal portions along the long edge of the container is obtained when the container is subjected to a liquid-releasing force, strip 9 not only extends to the very edge of the container but is also substantially wider than the width of the seal 31 and extends within the liquid-carrying cavity of the container, as shown in FIG. 2. A further precaution against the hazard of an uneven seal consists in displacing the blank containing strip 9 just beyond the long edge of the blank to which it is adhered. As a result, strip 9 projects beyond both long edges of the bond.

In the formation of the container, the contents may be introduced as the container walls are being sealed together. For example, the long edges of the container may be sealed together before the blank is severed from the stock of material from which it is formed. During the sealing together of the long edges, the desired quantity of liquid content for the container is introduced between the folded walls of the blank and thereafter the short edges are sealed together and the finished container severed from the remainder of the sheet stock. The sealing is preferably effected by the application of heat and/or pressure, and the uniform heat and/or pressure may be applied to all of the marginal portions being sealed together in view of the difference between adhesive properties of the strip 9 and those of the polyvinyl chloride of the inner layer 13.

In one preferred form of the container for spreading a liquid reagent to a thickness of approximately 0.003 inch over an area approximately three inches by four inches, a container 3½ inches long and having a maximum thickness of ⅟₁₆ of an inch can be used. The overall width of such container will be approximately ¾ of an inch and the width of the seals at the marginal areas will be approximately ³⁄₁₆ of an inch, while the seal at the release edge of the container will be approximately ⅟₁₆ of an inch. The overall thickness of the sheet materials from which the container walls are formed may be approximately 0.0048 of an inch, with layer 15 approximately 0.0025 of an inch thick, layer 14 approximately 0.0014 of an inch thick, and layer 13 approximately 0.0009 of an inch thick.

The aforesaid materials and constructions provide a container capable of substantially confining a liquid as, for example, a liquid adapted for processing a photographically exposed photosensitive film and, in conjunction therewith, said container effectively preventing loss of liquid content due to exudation, absorption, or evaporation thereof and acting to preserve said liquid substantially free from oxidation, it being understood that the liquid may be introduced into the container in an inert atmosphere.

The instant materials and constructions, to wit, frangible fluid containers comprising, respectively, an outer layer of kraft paper, a sheet of lead foil and an inner layer of polyvinyl chloride, having interposed between the long marginal edge thereof a strip comprising adhesive composition (1), and standards comprising representative prior art disclosed frangible fluid containers comprising, respectively, an outer layer of kraft paper, a sheet of lead foil and an inner layer of double coated polyvinyl butyral, having interposed between the long marginal edge thereof a strip comprising ethyl cellulose, were subjected to an accelerated aging test. The aging test comprised maintaining photographic processing composition retaining containers at a temperature of 190° F. for two weeks. This procedure disclosed severe deterioration of the standards' polyvinyl butyral layers in contradistinction to the instant containers which exhibited substantially no deterioration of their polyvinyl chloride layers.

The aforementioned experimental results are illustrative of the decreased fluid contamination and container deterioration afforded by the instant containers, especially decreased contamination and container deterioration caused by caustic liquids containing organic nitrogen compounds.

Where it is desired to increase the inherent low temperature flexibility of the polyvinyl chloride liner, a plasticizer may be added to the liner, for example, in the order of 5% by weight.

As examples of plasticizers found to be suitable for effecting increased low temperature flexibility mention may be made of:

Flexol DOP (trade name of Carbide & Carbon Chemicals Company, a division of Union Carbide & Carbon Corporation, New York, N.Y., for di-(2-ethylhexyl) phthalate); and Flexol R–2H (trade name of Carbide & Carbon Chemicals Company, a division of Union Carbide & Carbon Corporation, New York, N.Y., for a polyester plasticizer).

It will be understood that both the form and the capacity of the container and the dimensions and surfacing composition of the materials over which the liquid is to be spread are predetermined relative both to each other and to the compressive properties of pressure rollers or other suitable means for imparting compression.

It will be apparent that alternative forms of containers and arrangements thereof, with respect to a carrier material, may be provided within the scope of the invention. Said modifications may, for example, comprise a liquid-carrying portion of the container having either a greater or lesser traverse or longitudinal dimension than the container shown, or said modified container may have separable marginal surface portions for releasing the contained liquid which vary from the straight line linear portions illustrated.

Since certain changes may be made in the above products, it is intended that all matter contained in the above description or shown in the accompanying drawing shall be interpreted as illustrative and not in a limiting sense.

What is claimed is:

1. A rupturable, single use fluid container having a pair of opposed walls secured together to provide a liquid-retaining cavity, said cavity containing an aqueous alkaline photographic processing composition, each of said walls comprising a plurality of layers, at least one of said walls being flexible and deformable, at least one of said layers being substantially vapor impervious, the inner layer of each of said walls being in contact with said aqueous alkaline photographic processing composition and comprising a polymeric material containing a major portion of polymerized vinyl chloride, a thermoplastic adhesive interposed between the bonded marginal portions of one edge of said pair of opposed walls, said thermoplastic adhesive exhibiting substantially less adhesive affinity for said polymeric material than said polymer material exhibits for itself, said thermoplastic adhesive comprising polyvinylidene chloride, polyacrylonitrile-polyvinyl chloride and an acrylic ester resin, the remaining edges of said pair of opposed walls being adhered together by said polymeric material bonded to itself, whereby said container preferentially opens along said first-mentioned edge upon the application of pressure to said container.

2. A rupturable, single use fluid container having a pair of opposed walls secured together to provide a liquid-retaining cavity, said cavity containing an aqueous alkaline photographic processing composition, each of said walls comprising a plurality of layers, at least one of said walls being flexible and deformable, at least one of said layers being substantially vapor impervious, the inner layer of each of said walls being in contact with said aqueous alkaline photographic processing composition and comprising a polymeric material containing a major portion of polymerized vinyl chloride, a thermoplastic adhesive interposed between the bonded marginal portions of one edge of said pair of opposed walls, said thermoplastic adhesive exhibiting substantially less adhesive affinity for said polymeric material than said polymeric material exhibits for itself, said thermoplastic adhesive having admixed therewith an acrylic ester resin providing liquid impermeability and tightness to said adhesive, the remaining edges of said pair of opposed walls being adhered together by said polymeric material bonded to itself, whereby said container preferentially opens along said first-mentioned edge upon the application of pressure to said container.

3. A fluid container as defined in claim 2, wherein said inner layer comprises a homopolymer of vinyl chloride.

4. A fluid container as defined in claim 2, wherein said inner layer comprises a vinyl chloride-vinyl acetate copolymer.

5. A fluid container as defined in claim 2, wherein said inner layer comprises a vinyl chloride-vinylidene chloride copolymer.

6. A fluid container as defined in claim 2, wherein said inner layer comprises a homopolymer of vinyl chloride coated with polyvinylidene chloride.

7. A fluid container as defined in claim 2, wherein said photographic processing composition contains an organic nitrogen compound containing silver halide processing composition.

8. A fluid container as defined in claim 7, wherein said substantially vapor-impervious layer comprises metal foil.

9. A fluid container as defined in claim 8, wherein said metal foil comprises lead foil.

10. A fluid container as defined in claim 8, wherein said metal foil comprises aluminum foil.

11. A rupturable, single use fluid container having a pair of opposed walls secured together to provide a liquid-retaining cavity, said cavity containing an aqueous alkaline photographic processing composition, each of said walls comprising a plurality of layers, at least one of said walls being flexible and deformable, at least one of said layers being substantially vapor impervious, the inner layer of each of said walls being in contact with said aqueous alkaline photographic processing composition and comprising a polymeric material containing a major portion of polymerized vinyl chloride, a thermoplastic adhesive interposed between the bonded marginal portions of one edge of said pair of opposed walls, said thermoplastic adhesive exhibiting substantially less adhesive affinity for said polymeric material than said polymeric material exhibits for itself, said thermoplastic adhesive comprising polymerized vinylidene chloride, the remaining edges of said pair of opposed walls being adhered together by said polymeric material bonded to itself, whereby said container preferentially opens along said first-mentioned edge upon the application of pressure to said container.

12. A rupturable, single use fluid container having a pair of opposed walls secured together to provide a liquid-retaining cavity, said cavity containing an aqueous alkaline photographic processing composition, each of said walls comprising a plurality of layers, at least one of said walls being flexible and deformable, at least one of said layers being substantially vapor impervious, the inner layer of each of said walls being in contact with said aqueous alkaline photographic processing composition and comprising a polymeric material containing a major portion of polymerized vinyl chloride, a thermoplastic adhesive interposed between the bonded marginal portions of one edge of said pair of opposed walls, said thermoplastic adhesive exhibiting substantially less adhesive affinity for said polymeric material than said polymeric material exhibits for itself, said thermoplastic adhesive having admixed therewith a release agent comprising polyacrylonitrile-polyvinyl chloride, the remaining edges of said pair of opposed walls being adhered together by said polymeric material bonded to itself, whereby said container preferentially opens along said first-mentioned edge upon the application of pressure to said container.

References Cited in the file of this patent

UNITED STATES PATENTS

| | | |
|---|---|---|
| 2,134,246 | Elger | Oct. 25, 1938 |
| 2,224,835 | Reichert | Dec. 10, 1940 |
| 2,504,417 | Hofrichter | Apr. 18, 1950 |
| 2,543,181 | Land | Feb. 27, 1951 |
| 2,603,565 | Land | July 15, 1952 |
| 2,653,119 | Brennan | Sept. 22, 1953 |
| 2,653,732 | Land | Sept. 29, 1953 |
| 2,750,075 | Land et al. | June 12, 1956 |
| 2,861,718 | Winzen | Nov. 25, 1958 |
| 2,954,116 | Maso et al. | Sept. 27, 1960 |

FOREIGN PATENTS

| | | |
|---|---|---|
| 788,536 | Great Britain | Jan. 2, 1958 |